March 3, 1942.   G. L. NUTTALL   2,275,310

METHOD AND MEANS FOR REPAIRING VALVE SEAT PORTS

Filed July 1, 1939

Inventor.
George L. Nuttall.

by
[signature]
atty

Patented Mar. 3, 1942

2,275,310

UNITED STATES PATENT OFFICE 2,275,310

METHOD AND MEANS FOR REPAIRING VALVE SEAT PORTS

George L. Nuttall, Brantford, Ontario, Canada

Application July 1, 1939, Serial No. 282,379

6 Claims. (Cl. 29—156.4)

The principal objects of this invention are to provide a practical method and means for effecting the repair of engine blocks or heads which have been damaged due to the development of fractures in the valve port region and to thereby overcome the necessity of discarding the entire block.

A further and important object is to overcome the necessity of preheating the block and welding thereof which at best only achieves an uncertain repair and involves the objectionable likelihood of warping the entire block so that the efficiency of the engine is greatly impaired.

The principal feature of the invention resides in the novel method and means whereby the damaged valve port is bored out to receive a repair sleeve which not only provides a new valve pocket and outlet port, but which is so formed in conjunction with a cylinder repair sleeve so that the respective sleeves physically co-operate with each other and with the damaged area to present a complete seal about the damaged or cracked portion, whereby communication is definitely prevented between the valve pocket, cooling base and cylinder interior.

In the drawing Figure 1 is a fragmentary perspective view of a cylinder block showing the cylinder sleeve inserted and valve pocket bored out ready for the reception of the repair sleeve.

In the operation of internal combustion engines defects frequently occur in the valve port region due principally to the sudden chilling of this area and the resultant concentration of strain due to shrinkage which produces a fracture or crack between the valve port and cylinder and thereby allowing the cooling fluid to escape from the cooling chamber into either the valve port or the cylinder, or both.

Due to the nature of the fracture and the peculiar location thereof it has been found to be impractical to effect a satisfactory repair by the usual welding method.

It has been proposed to bore the cylinder and insert a repair sleeve, but such sleeve in itself while isolating the cylinder from the fractured region only achieves a partial alleviation of the trouble in view of the fact that the fracture invariably extends also through the valve port wall.

According to the present invention the cylinder 1 adjacent the damaged port 2 is bored out sufficiently to receive the repair sleeve 3 in a press fit so that it forms a seal across the cylinder side of the fracture shown at 4.

Figure 6:
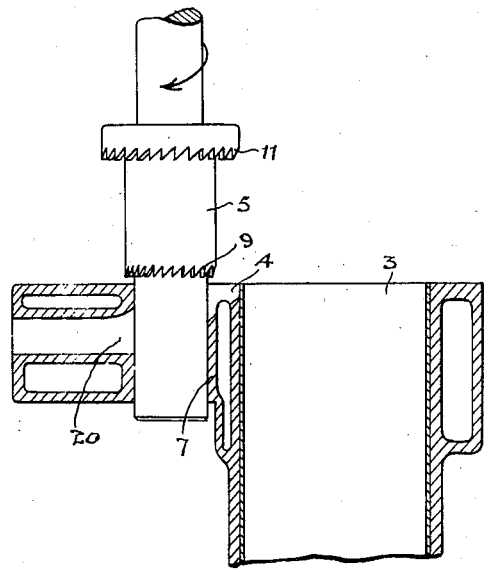
Figure 6 is a sectional elevation of the block showing the cylinder repair sleeve in place and the wall of the valve port about to be bored out to receive the repair sleeve.
Figure 5:
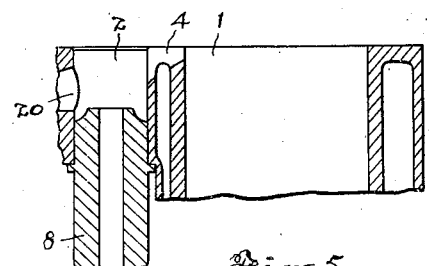
Figure 5 is a fragmentary sectional elevation of the damaged cylinder block prior to repair.

A special boring tool 5 (see Figure 6) is then positioned with its pilot end section in guiding contact with a cylindrical wall 7 of the lower portion of the valve port 2 from which a valve guide 8 has been previously removed. The tool 5 is then operated to cause the advance cutting portion 9 to bore out the wall of the valve pocket, either completely through or to a suitable depth forming the enlarged bore 10, and the cylindrical portion 5 will act as a guide in the fresh bore as a cutting portion 11 is advanced into the block a sufficient distance to form a shallow counterbore 12, which is preferably of such size as to actually extend a slight distance into the previously inserted cylinder sleeve 3 so that an arc-shaped recess 13 is formed in the latter forming a continuation of the periphery of the counterbore 12.

It will thus be noted that the larger cutting tool 11 actually cuts away the upper region of the fractured area at the point where it meets the cylinder sleeve 3.

Figure 3:
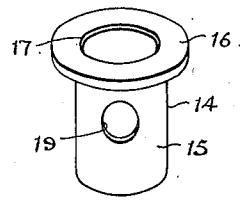
Figure 3 is a detail perspective view of a valve port repair sleeve constructed in accordance with the present invention.
Figure 2:
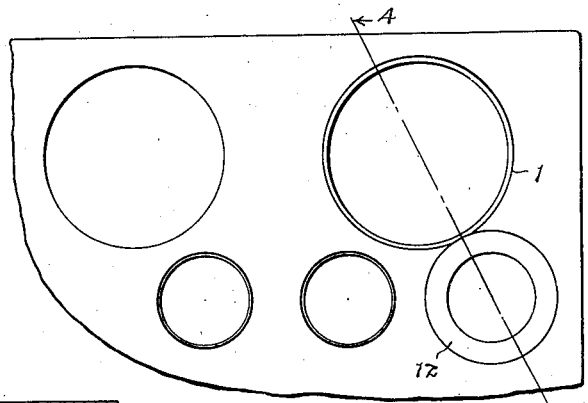
Figure 2 is a fragmentary plan view of the structure shown in Figure 1 showing both cylinder and valve port repair sleeves in place.

A special repair sleeve 14 (see Figure 3) is formed with a sleeve portion 15 provided with a flanged upper end 16, and the diameters of the sleeve and flange portions are slightly greater than the diameters of the bores made by the tools 9 and 11 so that the sleeve when pressed into the bored-out valve pocket will present a snug sealing contact about the peripheries of the sleeve and flange with the adjacent walls of the bore, and not only will the flange 16 overlap the top of the fracture, but it will also extend into snug sealing contact with the arc-shaped surface 13 of the cylinder sleeve so that the respective sleeves will form collectively a complete enclosure about the fractured zone by preventing leakage either into the cylinder or into the valve port.

It will be noted that in boring out the valve pocket the original seat will be completely removed and the repair sleeve will be refinished with a new valve seat 17.

Figure 4:
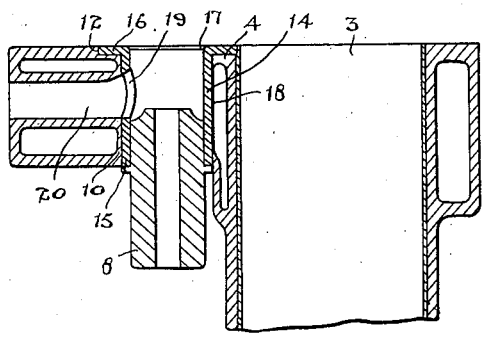
Figure 4 is a sectional elevation taken on the line 4—4 of Figure 2 showing the completed repair.
Figure 1:
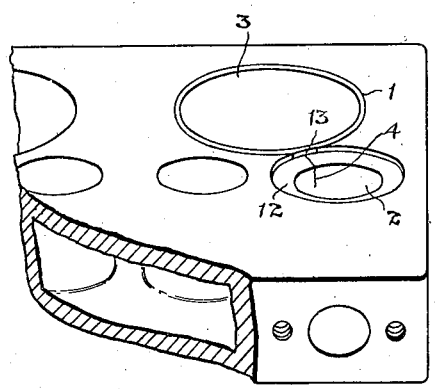

In practice it will be found in many cases that the boring tool 9 or possibly the tool 11 will cut completely through the wall of the valve pocket into the cooling chamber, as indicated for instance at 18, Figure 4, but the insertion of the special repair sleeve and accurate finishing of the contacting surfaces achieves a complete seal and an entirely new valve port wall will be provided.

The sleeve portion 15 is here shown provided with a port 19 which is so placed as to register with the standard exhaust or intake port 20 of the block.

The interior diameter of the sleeve will be finished to substantially represent the original internal dimensions of the valve pocket or guide chamber and the valve guide 18 may be inserted in its original position within the repair member as indicated in Figure 4.

The flange 16 may be of greater thickness than the depth of the shallow counterbore 12 so that the upper surface may be finished flush with the upper surface of the block by a suitable milling or grinding operation prior to forming the seat 17, or in certain cases the repair sleeve may be made with a flange of an accurately predetermined depth initially provided with a valve seat.

I am aware of the fact that engine blocks have been made with a "valve cage" originally incorporated therein in a removable or interchangeable manner or as a wear-resisting element in conjunction with an aluminum block, but such former practices do not take into consideration the repairing of standard type engine blocks.

While I have shown and described the present invention applied to an engine cylinder block it will be understood that the same may be applied to the repairing of cracked valve ports in engine heads of the overhead valve type and where "engine block" is referred to, this term should be construed as including an engine head of the type referred to.

What I claim as my invention is:

1. A method of repairing cracked valve ports in engine blocks of the type having the end of the port cylindrically finished to receive a removeable valve guide, comprising removing the valve guide, inserting a boring tool in the valve port and boring out the valve port wall including the cylindrically surfaced portion and arranging a counterbore to intersect the fracture while utilizing the original valve port wall as a guideway for the boring tool, inserting a flanged sleeve in a press fit in said bore with the flange forming a stepped sealing joint over the fracture, providing a valve seat on the flanged end of the sleeve, and finishing the interior diameter of the other end of the sleeve to correspond to the original diameter of said cylindrically surfaced portion of the valve port to receive the previously removed valve guide.

2. The combination with an engine cylinder block having a cylinder and a valve port adjacent thereto and having the intervening wall fractured, of means forming a continuous seal about the fracture extending from the port side to the cylinder side comprising co-operatively engaging sleeve members fitted respectively in said valve port and cylinder and each extending well below the bottom limit of the fracture in the valve port and cylinder respectively.

3. The combination with an engine cylinder block having a cylinder and a valve port adjacent thereto and having the intervening wall fractured, of means forming a continuous seal about the fracture extending from the port side to the cylinder side including a repair sleeve fitted tightly in the valve port forming a part at least of the wall thereof, and a cylinder sleeve, said respective sleeves having portions disposed in physical sealing contact in bridging relation to said fracture.

4. The combination with an engine cylinder block having a cylinder and a valve port adjacent thereto and having the intervening wall fractured, of means forming a continuous seal about the fracture extending from the port side to the cylinder side including a repair sleeve fitted in said valve port in sealing contact with the wall thereof and having a flange portion recessed into the block in bridging relation to said fracture, and a cylinder sleeve fitted in said cylinder in sealing relation to said fracture on the cylinder side and having said sleeve flange recessed thereinto in a substantially stepped joint.

5. A method of repairing fractures occurring in engine blocks between cylinders and ports comprising fitting a sleeve in the cylinder, boring out the port wall concentric with the axis to a depth below the fracture and forming a counterbore to intersect the fracture at the outer end and extend peripherally into the wall of said cylinder sleeve to form a recess therein, and tightly fitting a flanged sleeve member with the sleeve and flange portions in tight sealing contact with the walls of the bore and counterbore in overlapped sealing relation to the fracture with the flange of said sleeve extending into said recess in the cylinder sleeve in physical sealing contact with said sleeve.

6. The combination with an engine cylinder block having a cylinder and a valve port adjacent thereto with a water space therebetween and having the intervening wall fractured continuously from the cylinder interior to the valve port interior forming a path of leakage between said water space and said cylinder and port, of a sleeve tightly fitted in said valve port overlapping the fracture on the port side and extending therebelow and having a flange portion overlapping the top of the fracture, and means for sealing the cylinder side of said fracture and physically engaging the flange portion of said sleeve and forming with said sleeve and its flange portion a continuous seal about the fracture from the port side to the cylinder side thereof.

GEORGE L. NUTTALL.